United States Patent
Saito

(10) Patent No.: US 9,818,540 B2
(45) Date of Patent: Nov. 14, 2017

(54) FILM CAPACITOR

(71) Applicant: TOYOTA JIDOSHA KABUSHIKI KAISHA, Toyota-shi, Aichi-ken (JP)

(72) Inventor: Takahiro Saito, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 110 days.

(21) Appl. No.: 14/873,860

(22) Filed: Oct. 2, 2015

(65) Prior Publication Data
US 2016/0099109 A1 Apr. 7, 2016

(30) Foreign Application Priority Data
Oct. 6, 2014 (JP) .................................. 2014-205514

(51) Int. Cl.
*H01G 4/018* (2006.01)
*H01G 4/30* (2006.01)
*H01G 4/20* (2006.01)

(52) U.S. Cl.
CPC ............... *H01G 4/206* (2013.01); *H01G 4/30* (2013.01); *H01G 4/306* (2013.01)

(58) Field of Classification Search
CPC .................................. H01G 4/306; H01G 4/14
See application file for complete search history.

(56) References Cited

FOREIGN PATENT DOCUMENTS

| JP | 59-063423 U | | 4/1984 |
|---|---|---|---|
| JP | 2007-019327 A | | 1/2007 |
| JP | 2010192787 A | | 9/2010 |
| JP | 2012-069840 A | | 4/2012 |
| JP | 2012232435 A | * | 11/2012 |

* cited by examiner

*Primary Examiner* — Eric Thomas
(74) *Attorney, Agent, or Firm* — Sughrue Mion, PLLC

(57) ABSTRACT

A film capacitor includes a stacked body formed by stacking metalized films in each of which a metal electrode is formed on a surface of a dielectric film, at least one of the dielectric films containing a high thermal conductive filler; and external electrodes formed at electrode forming ends provided at opposed positions in the stacked body. The stacked body includes a high thermal conductive portion in which a content of the high thermal conductive filler in the at least one dielectric film is relatively high, and a low thermal conductive portion in which the content of the high thermal conductive filler in the at least one dielectric film is relatively low, or the high thermal conductive filler is not contained. The high thermal conductive portion is provided to continuously extend from an inside of the stacked body to a side portion other than the electrode forming ends.

4 Claims, 11 Drawing Sheets

FILM CAPACITOR

INCORPORATION BY REFERENCE

The disclosure of Japanese Patent Application No. 2014-205514 filed on Oct. 6, 2014 including the specification, drawings and abstract is incorporated herein by reference in its entirety.

BACKGROUND OF THE INVENTION

1. Field of the Invention

The invention relates to a film capacitor and in particular to a film capacitor with excellent heat resistance, heat dissipation, and workability.

2. Description of Related Art

Conventionally, due to an electrical characteristic of a high withstand voltage and low loss, a metalized film capacitor (also referred to as a metal-deposited-electrode type capacitor) in which metal such as aluminum is deposited on a surface of a dielectric film made of polypropylene or the like has been used in various industrial fields including a home appliance industry and an automotive industry.

It has been known that an electrostatic capacitance of this type of the film capacitor greatly depends on a temperature and that the electrostatic capacitance decreases with a temperature increase. It has also been known that, for example, in the case where large high-frequency noise, an in-rush current, a short-circuit current, or a lightning surge current flows through the capacitor during use and an operating temperature increases, a crack is produced on the inside of the dielectric film when the temperature of the capacitor returns from a high temperature to a room temperature or the like. Accordingly, a leakage current increases, and the capacitor can no longer withstand a high electric field. As a result, the withstand voltage decreases.

To address such a problem, Japanese Patent Application Publication No. 2007-19327 (JP 2007-19327 A) describes a high heat resistance film capacitor which has a capacitor element constituted by a dielectric film and a conductor, and in which a synthetic polymer compound contained in the dielectric film contains insulating ceramic fine particles with thermal conductivity of 4 W/m·K or higher.

In the high heat resistance film capacitor described in JP 2007-19327 A, the synthetic polymer compound contained in the dielectric film contains the insulating ceramic fine particles with the thermal conductivity of 4 W/m·K or higher. Thus, the film capacitor has excellent heat resistance and heat dissipation. In addition, rated capacitance can be increased by increasing current density. Furthermore, a cooling device (a fan or a heat sink) or the like does not need to be provided. Thus, a configuration of the capacitor is simplified. As a result, downsizing and cost reduction can be achieved.

However, in the high heat resistance film capacitor described in JP 2007-19327 A, the dielectric film contains the synthetic polymer compound, which contains the insulating ceramic fine particles composed of aluminum nitride, beryllium oxide, alumina, silicon carbide, diamond, boron nitride or the like, in a state where the synthetic polymer compound is dispersed over the entire dielectric film. Thus, toughness of the dielectric film itself decreases and workability thereof decreases (for example, in the case where the toughness of the dielectric film is low, the dielectric film may break due to stress applied to the dielectric film when evaporated metal is deposited on a surface of the dielectric film), and production cost increases.

SUMMARY OF THE INVENTION

The invention provides a film capacitor that makes it possible to increase workability while maintaining heat resistance and heat dissipation, and to reduce production cost.

An aspect of the invention relates to a film capacitor including a stacked body formed by stacking metalized films in each of which a metal electrode is formed on a surface of a dielectric film, at least one of the dielectric films of the stacked body containing a high thermal conductive filler; and external electrodes formed at electrode forming ends provided at opposed positions in the stacked body. The stacked body includes a high thermal conductive portion in which a content of the high thermal conductive filler in the at least one dielectric film is relatively high, and a low thermal conductive portion in which the content of the high thermal conductive filler in the at least one dielectric film is relatively low, or the high thermal conductive filler is not contained. The high thermal conductive portion is provided to continuously extend from an inside of the stacked body to a side portion other than the electrode forming ends.

Examples of the material for forming the dielectric film of the film capacitor according to the above-mentioned aspect of the invention include paper, polyethylene terephthalate, polyethylene naphthalate, polypropylene, polyphenylene sulfide, polyvinylidene fluoride, polyether imide, polyimide, and polyimide amide. In addition, the metal electrode, which is formed on the surface of the dielectric film, can be formed by disposing metal foil on the surface of the dielectric film or depositing evaporated metal on the surface of the dielectric film. Examples of the material for forming the metal foil and the deposited metal include metals such as aluminum (Al), zinc (Zn), tin (Sn), copper (Cu), iron (Fe), nickel (Ni), and chrome (Cr), and alloys thereof. Furthermore, the deposited metal can be formed by vacuum film forming methods that include a vacuum deposition method, a sputtering method, and a laser ablation method, for example.

The high thermal conductive filler contained in the dielectric film is a filler with the thermal conductivity that is higher than at least that of the material for forming the dielectric film (the material of which the dielectric film is formed).

Examples of the material for forming the high thermal conductive filler include silica ($SiO_2$), calcium fluoride ($CaF_2$), alumina ($Al_2O_3$), magnesium oxide (MgO), boron nitride (BN), aluminum nitride (AlN), and carbon nanotube (CNT).

The stacked body of the film capacitor according to the above-mentioned aspect of the invention may be formed by superimposing on each other plural pairs of the metalized films in a thickness direction, or may be formed by winding a pair of the metalized films around a winding core. It should be noted that, in the case where the metalized films are wound around the winding core, the winding core may be a shaft-shaped core member with a specified cross-sectional shape or may be a hollow core.

In the film capacitor of the above-mentioned aspect, the stacked body, which is formed by stacking the metalized films, includes the high thermal conductive portion in which the content of the high thermal conductive filler in the at least one dielectric film is relatively high, and the low thermal conductive portion in which the content of the high thermal conductive filler in the at least one dielectric film is relatively low, or the high thermal conductive filler is not contained. The high thermal conductive portion is provided to continuously extend from the inside of the stacked body to the side portion other than the electrode forming ends provided with the external electrodes of the stacked body. Thus, heat generated in the stacked body is transferred to the side portion other than the electrode forming ends via the high thermal conductive portion in which the content of the high thermal conductive filler is relatively high, and the heat is dissipated to the outside. Meanwhile, at least a part of the metalized films constituting the stacked body is constituted by the low thermal conductive portion in which the content of the high thermal conductive filler is relatively low or the high thermal conductive filler is not contained. Thus, the workability in producing the film capacitor can be secured while heat resistance and heat dissipation thereof are kept. In addition, production cost thereof can effectively be suppressed.

It should be noted that the inside of the stacked body signifies a portion of the metalized film that is positioned inside the metalized film adjacent to the outside of the stacked body, the portion of the metalized film excluding the side portion other than the electrode forming ends provided with the external electrodes.

In the above-mentioned aspect, each of the dielectric films of the stacked body may include a high thermal conductive region in which the content of the high thermal conductive filler is relatively high, and a low thermal conductive region in which the content of the high thermal conductive filler is relatively low, or the high thermal conductive filler is not contained; the high thermal conductive region may be provided to continuously extend from an inside of each of the dielectric films to an end of the dielectric film, the end corresponding to the side portion other than the electrode forming ends, when seen in a thickness direction of the dielectric film; and the metalized films may be stacked in the thickness direction so as to form the stacked body.

In the above-mentioned aspect, the dielectric films of the stacked body may include a high thermal conductive film in which the content of the high thermal conductive filler is relatively high and the high thermal conductive filler is disposed in a dispersed manner, and a low thermal conductive film in which the content of the high thermal conductive filler is relatively low and the high thermal conductive filler is disposed in the dispersed manner, or the high thermal conductive filler is not contained; and the metalized film, in which the metal electrode is formed on a surface of the high thermal conductive film, may be stacked at a relatively inner position in a stacking direction, and the metalized film, in which the metal electrode is formed on a surface of the low thermal conductive film, may be stacked at a relatively outer position in the stacking direction, so as to form the stacked body.

In the film capacitor of the above-mentioned aspect, the stacked body of the film capacitor has a simple configuration. In particular, each of the dielectric films of the stacked body includes the high thermal conductive region in which the content of the high thermal conductive filler is relatively high, and the low thermal conductive region in which the content of the high thermal conductive filler is relatively low, or the high thermal conductive filler is not contained; the high thermal conductive region is provided to continuously extend from the inside of each of the dielectric films to the end of the dielectric film, the end corresponding to the side portion other than the electrode forming ends, when seen in the thickness direction of the dielectric film; and the metalized films are stacked in the thickness direction so as to form the stacked body. In this case, a sufficient surface area of the high thermal conductive region (the high thermal conductive portion) in the surface of the stacked body can be secured, and in addition, each of the electrode forming ends is constituted by the low thermal conductive region (the low thermal conductive portion). Thus, the heat resistance and the heat dissipation of the film capacitor can be increased, and the workability in producing the film capacitor can reliably be secured.

As it can be understood from the above description, in the film capacitor according to the above-mentioned aspect of the invention, the stacked body that is formed by stacking the metalized films includes the high thermal conductive portion in which the content of the high thermal conductive filler in the at least one dielectric film is relatively high; and the low thermal conductive portion in which the content of the high thermal conductive filler in the at least one dielectric film is relatively low, or the high thermal conductive filler is not contained. The high thermal conductive portion is provided to continuously extend from the inside of the stacked body to the side portion other than the electrode forming ends provided with the external electrodes of the stacked body. Thus, in the film capacitor including the at least one dielectric film containing the high thermal conductive filler, the workability in producing the film capacitor can be increased while the heat resistance and the heat dissipation thereof are maintained. In addition, the production cost thereof can be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A description will hereinafter be made on embodiments of the invention with reference to the drawings.

First Embodiment

Figure 1:
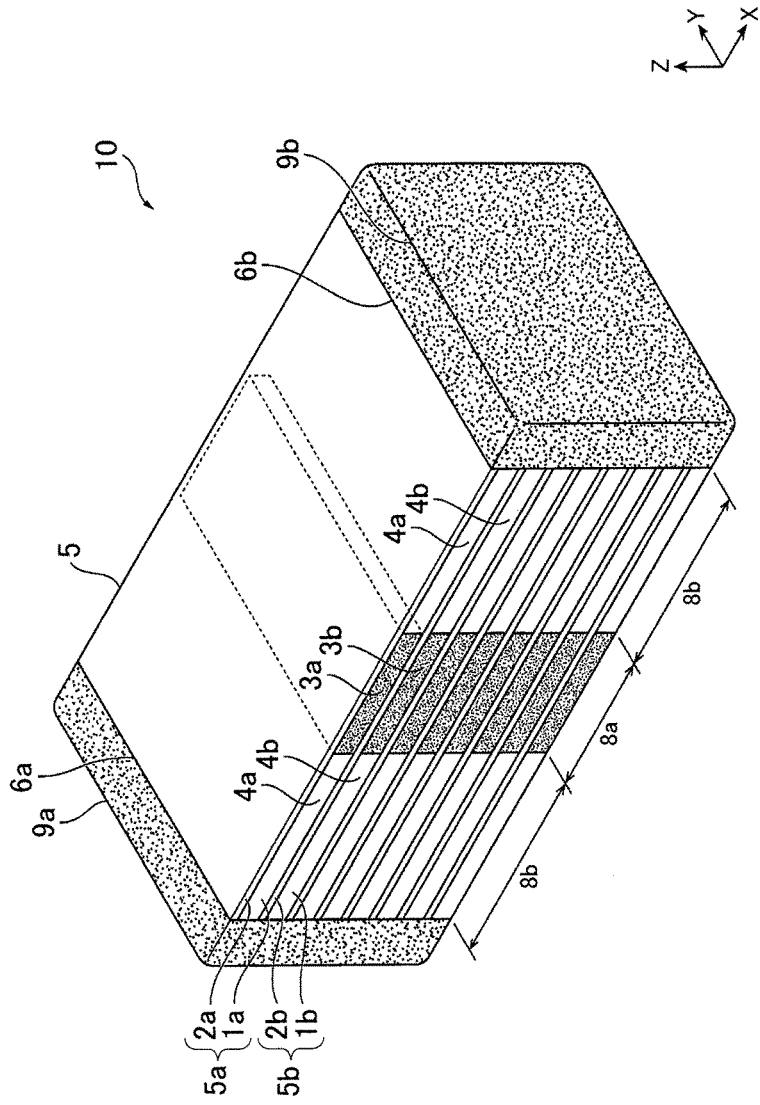
FIG. 1 is a perspective view showing a basic configuration of a film capacitor according to a first embodiment of the invention.
Figure 2:
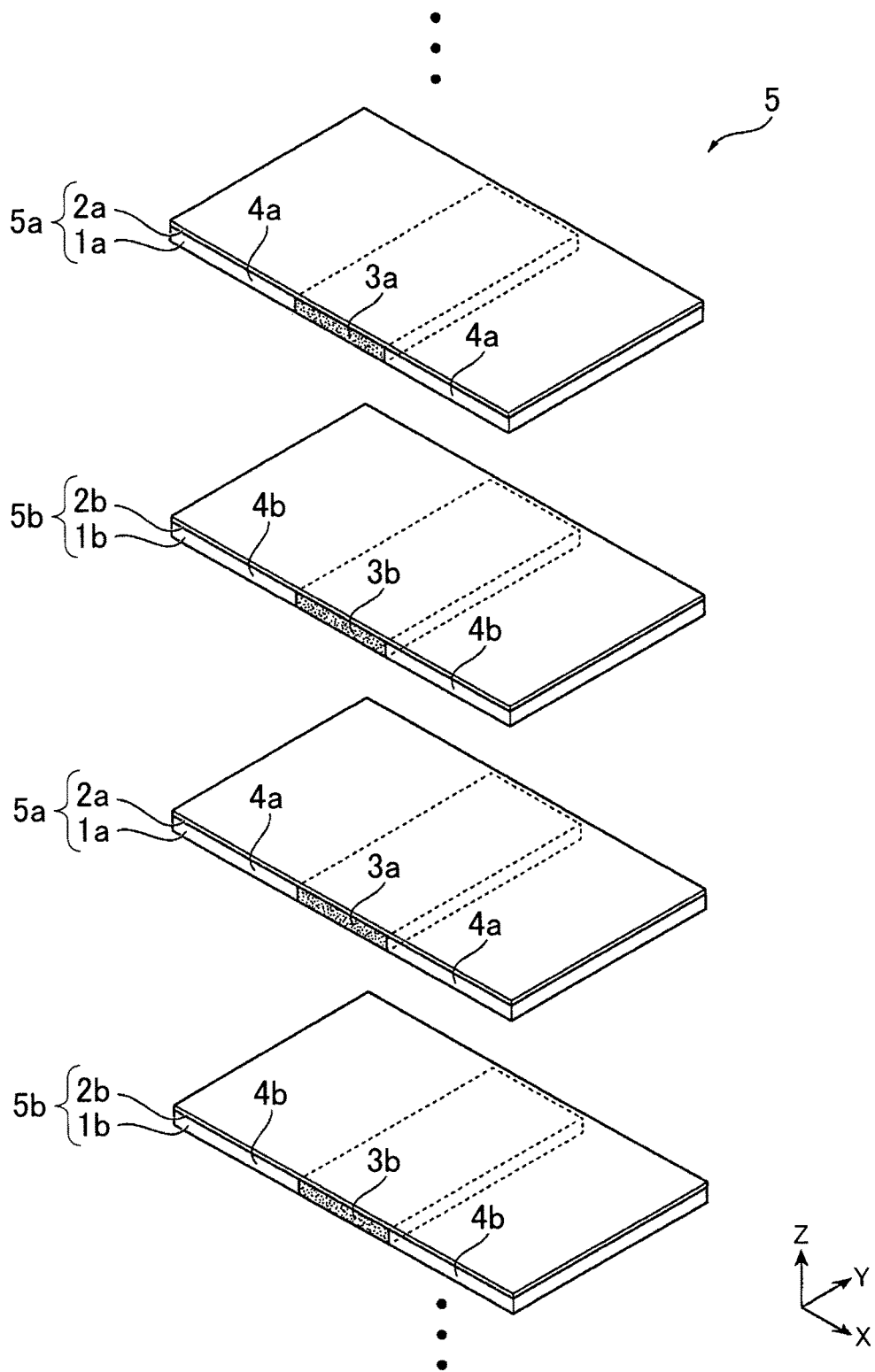
FIG. 2 is an exploded perspective view in which a stacked body of the film capacitor shown in FIG. 1 is exploded.

FIG. 1 is a perspective view showing a basic configuration of a film capacitor according to a first embodiment of the invention, and FIG. 2 is an exploded perspective view in which a stacked body of the film capacitor shown in FIG. 1 is exploded.

A film capacitor 10, which is shown, mainly includes: a stacked body 5 in a substantially rectangular shape that is formed by stacking metalized films 5a, 5b in a thickness direction (a Z-direction in the drawing), metal electrodes 2a, 2b being respectively formed on surfaces of dielectric films 1a, 1b in substantially rectangular shapes in the metalized films 5a, 5b; and external electrodes 9a, 9b respectively formed on both of opposed side portions (electrode forming ends) 6a, 6b of the stacked body 5 (i.e., both of the side portions 6a, 6b that are opposed to each other in a right-left direction (an X-direction in the drawing) in an illustrated example).

In the paired metalized films 5a, 5b, the film-shaped metal electrodes 2a, 2b that constitute internal electrodes are respectively formed on the surfaces of the paired dielectric films 1a, 1b in a thickness of several μm to several tens of μm. The plural pairs of the metalized films 5a, 5b are superimposed on each other (placed on top of each other) in the thickness direction. Thus, the stacked body 5 is formed. One of these paired metalized films 5a, 5b constitutes a positive electrode, whereas the other thereof constitutes a negative electrode. The metalized film constituting the positive electrode and the metalized film constituting the negative electrode are alternately stacked, and thus, the stacked body 5 is formed.

It should be noted that examples of the material for forming the dielectric films 1a, 1b include paper, polyethylene terephthalate, polyethylene naphthalate, polypropylene, polyphenylene sulfide, polyvinylidene fluoride, polyether imide, polyimide, and polyimide amide. In addition, the metal electrodes 2a, 2b, which are respectively formed on the surfaces of the dielectric films 1a, 1b, can be formed by disposing metal foil on the surfaces of the dielectric films 1a, 1b or by depositing deposited metal on the surfaces of the dielectric films 1a, 1b. Examples of the material for forming the metal foil and the deposited metal include metals such as aluminum (Al), zinc (Zn), tin (Sn), copper (Cu), iron (Fe), nickel (Ni), and chrome (Cr), and alloys thereof. Furthermore, the deposited metal can be formed by vacuum film forming methods that include a vacuum deposition method, a sputtering method, and a laser ablation method, for example.

Moreover, the dielectric films 1a, 1b of the stacked body 5 respectively include: high thermal conductive regions 3a, 3b in which a content of a high thermal conductive filler is relatively high (that is, the high thermal conductive regions 3a, 3b with high thermal conductivity); and low thermal conductive regions 4a, 4b in which the content of the high thermal conductive filler is relatively low, or the high thermal conductive filler is not contained (that is, the low thermal conductive regions 4a, 4b with low thermal conductivity). In other words, the content of the high thermal conductive filler in the high thermal conductive regions 3a, 3b is higher than the content of the high thermal conductive filler in the low thermal conductive regions 4a, 4b.

In the illustrated example, the high thermal conductive regions 3a, 3b are respectively provided to extend in a front-rear direction (a Y-direction in the drawing) in central portions that are formed by substantially equally dividing the dielectric films 1a, 1b into three in the right-left direction. The low thermal conductive regions 4a, 4b are respectively provided in side portions (right side portions and left side portions that are formed by substantially equally dividing the dielectric films 1a, 1b into three in the right-left direction) on the sides of the high thermal conductive regions 3a, 3b provided in the central portions. In other words, when seen in the thickness direction of the dielectric films 1a, 1b, the high thermal conductive regions 3a, 3b are provided to continuously extend from the inside of the dielectric films 1a, 1b (particularly center portions thereof) to ends (in the illustrated example, front ends and rear ends) that correspond to side portions (in the illustrated example, front side portions and rear side portions) other than both of the side portions 6a, 6b respectively provided with the external electrodes 9a, 9b. The low thermal conductive regions 4a, 4b are provided at ends (in the illustrated example, right ends and left ends) that correspond to both of the side portions 6a, 6b respectively provided with the external electrodes 9a, 9b.

In the metalized films 5a, 5b, the metal electrodes 2a, 2b are respectively formed on the surfaces of the dielectric films 1a, 1b that respectively have the high thermal conductive regions 3a, 3b and the low thermal conductive regions 4a, 4b, as described above. The metalized films 5a, 5b are stacked such that the high thermal conductive regions 3a, 3b are superimposed on each other (placed on top of each other) (see FIG. 2). Thus, a high thermal conductive portion 8a that is constituted by the high thermal conductive regions 3a, 3b of the dielectric films 1a, 1b and the metal electrodes formed on upper surfaces thereof is provided (to extend in the front-rear direction and in the up-down direction) in a central portion that is formed by substantially equally dividing the stacked body 5 into three in the right-left direction. Low thermal conductive portions 8b that are each constituted by the low thermal conductive regions 4a, 4b and the metal electrodes formed on upper surfaces thereof are provided in side portions (a right side portion and a left side portion that are formed by substantially equally dividing the stacked body 5 into three in the right-left direction) on the sides of the high thermal conductive portion 8a. Then, molten metal, such as zinc, is sprayed on (ends of) the low thermal conductive portions 8b, and the molten metal adheres to surfaces (of the ends) of the low thermal conductive portions 8b. In this way, the external electrodes (also referred to as metal-sprayed electrodes) 9a, 9b are formed.

It should be noted that the high thermal conductive filler contained in the dielectric films 1a, 1b is a filler with the thermal conductivity that is higher than at least that of the material for forming the dielectric films 1a, 1b. Examples of the material for forming the filler include silica ($SiO_2$), calcium fluoride ($CaF_2$), alumina ($Al_2O_3$), magnesium oxide (MgO), boron nitride (BN), aluminum nitride (AlN), carbon nanotube (CNT), beryllium oxide, silicon carbide, and diamond.

In addition, in the film capacitor 10 configured as described above, a busbar is attached to each of the external electrodes 9a, 9b by welding, for example. The film capacitor 10 in this state is covered with a molding material made of an epoxy resin or the like.

As described above, in the film capacitor 10 of the first embodiment, the stacked body 5 that is formed by stacking the metalized films 5a, 5b in the thickness direction includes: the high thermal conductive portion 8a in which the content of the high thermal conductive filler in the dielectric films 1a, 1b is relatively high (i.e., the high thermal conductive portion 8a with the high thermal conductivity); and the low thermal conductive portions 8b in which the content of the high thermal conductive filler in the dielectric films 1a, 1b is relatively low, or the high thermal conductive filler is not contained (i.e., the low thermal conductive portions 8b with the low thermal conductivity). The high thermal conductive portion 8a is provided to continuously extend from the inside of the stacked body 5 (particularly, a center portion whose temperature may become a high temperature) to the side portions (the front and rear side portions as well as the upper and lower side portions in the illustrated example) other than both of the side portions (the electrode forming ends) 6a, 6b respectively provided with the external electrodes 9a, 9b. In this way, heat generated in the stacked body 5 is transferred to the side portions other than both of the side portions 6a, 6b respectively provided with the external electrodes 9a, 9b, via the high thermal conductive portion 8a, and is dissipated to the outside. Meanwhile, both of the side portions 6a, 6b respectively provided with the external electrodes 9a, 9b and portions inside the side portions 6a, 6b are constituted by the low thermal conductive portions 8b in which the content of the high thermal conductive filler is relatively low or the high thermal conductive filler is not contained. Thus, workability in producing the film capacitor 10 (for example, workability in work in which the evaporated metal is deposited on the surfaces of the dielectric films 1a, 1b so as to form the metal electrodes 2a, 2b) can reliably be secured while the heat resistance and the heat dissipation thereof are maintained. In addition, the production cost thereof can be effectively reduced.

Second Embodiment

Figure 3:
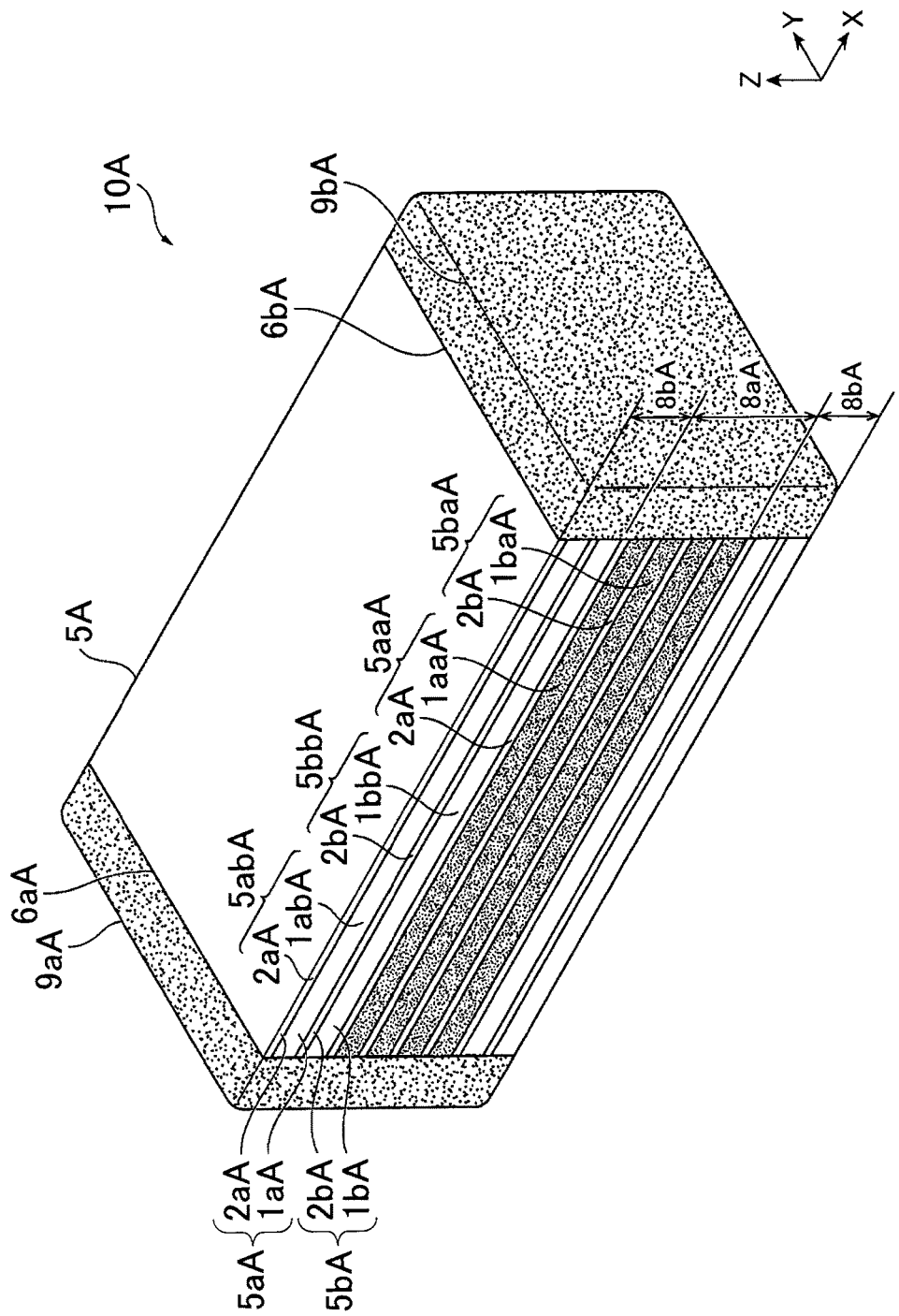
FIG. 3 is a perspective view showing a basic configuration of a film capacitor according to a second embodiment of the invention.
Figure 4:
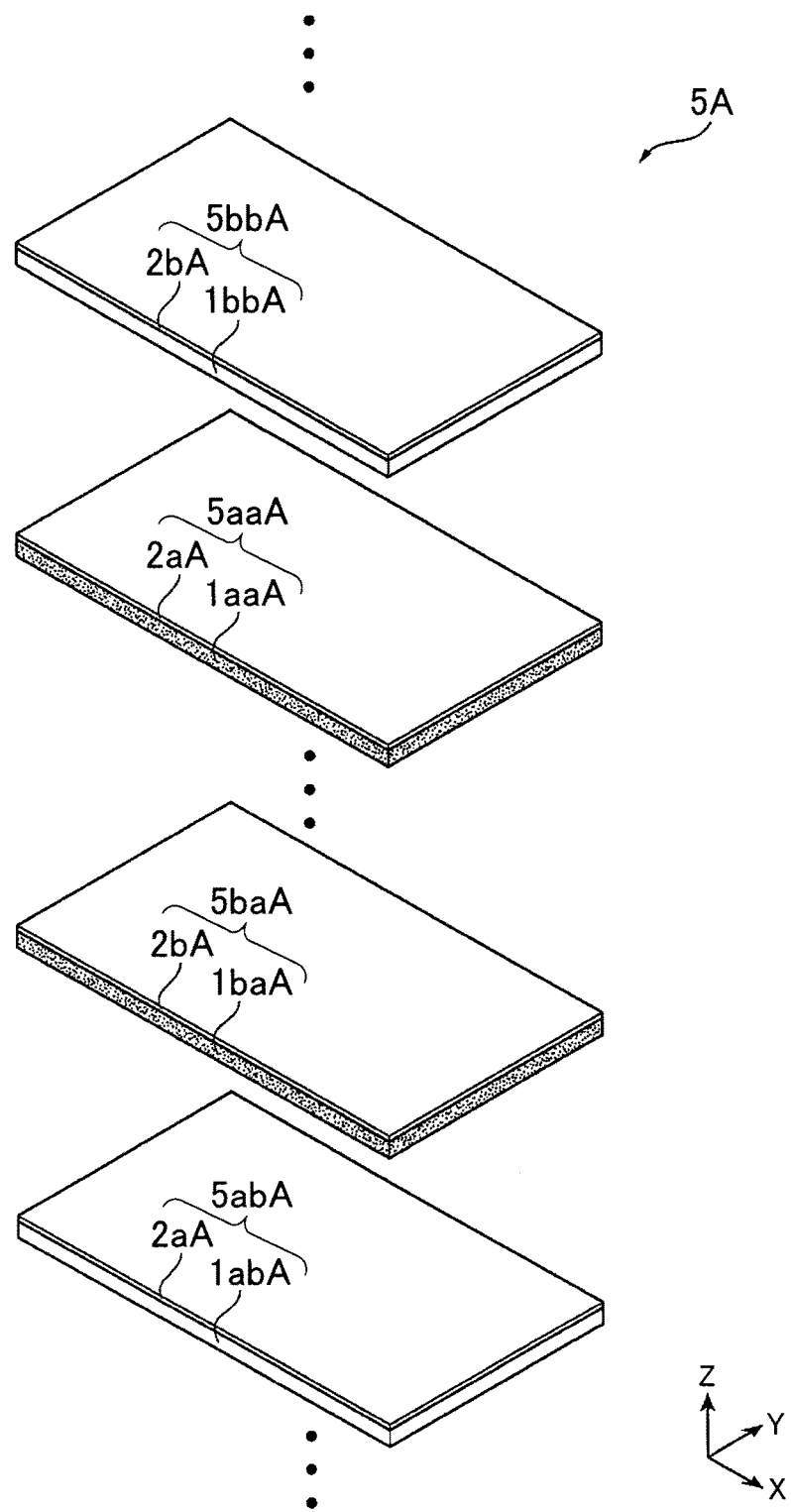
FIG. 4 is an exploded perspective view in which a stacked body of the film capacitor shown in FIG. 3 is exploded.

FIG. 3 is a perspective view showing a basic configuration of a film capacitor according to the second embodiment of the invention, and FIG. 4 is an exploded perspective view in which a stacked body of the film capacitor shown in FIG. 3 is exploded. A film capacitor 10A of the second embodiment, which is shown in FIG. 3, differs from the film capacitor 10 of the first embodiment described above in terms of an internal structure of the stacked body. The rest of a configuration of the film capacitor 10A is substantially the same as that of the film capacitor 10 of the first embodiment. Thus, the same configuration as that of the film capacitor 10 of the first embodiment will not be described in detail.

In the second embodiment, dielectric films 1aA, 1bA of a stacked body 5A of the film capacitor 10A respectively include: high thermal conductive films 1aaA, 1baA in which the content of the high thermal conductive filler is relatively high and the high thermal conductive filler is disposed in a dispersed manner; and low thermal conductive films 1abA, 1bbA in which the content of the high thermal conductive filler is relatively low and the high thermal conductive filler is disposed in the dispersed manner, or the high thermal conductive filler is not contained.

Metal electrodes 2aA, 2bA are respectively formed on surfaces of the high thermal conductive films 1aaA, 1baA in metalized films 5aaA, 5baA. The metalized films 5aaA, 5baA are stacked in a central portion in a stacking direction (the thickness direction). The metal electrodes 2aA, 2bA are also respectively formed on surfaces of the low thermal conductive films 1abA, 1bbA in metalized films 5abA, 5bbA. The metalized films 5abA, 5bbA are stacked on an upper side and a lower side of the metalized films 5aaA, 5baA in the stacking direction (the thickness direction) (see FIG. 4). In this way, a high thermal conductive portion 8aA is constituted by the metalized films 5aaA, 5baA in which the metal electrodes 2aA, 2bA are respectively formed on upper surfaces of the high thermal conductive films 1aaA, 1baA. The high thermal conductive portion 8aA is provided in the central portion of the stacked body 5A in the stacking direction (to extend in the front-rear direction and the right-left direction). Low thermal conductive portions 8bA are constituted by the metalized films 5abA, 5bbA in which the metal electrodes 2aA, 2bA are respectively formed on upper surfaces of the low thermal conductive films 1abA, 1bbA. The low thermal conductive portions 8bA are provided outside the high thermal conductive portion 8aA (on an upper side and a lower side of the high thermal conductive portion 8aA) in the stacking direction (to extend in the front-rear direction and the right-left direction).

In the film capacitor 10A of the second embodiment, as in the film capacitor 10 of the first embodiment described above, the stacked body 5A that is formed by stacking the metalized films 5aA, 5bA in the thickness direction includes: the high thermal conductive portion 8aA (the metalized films 5aaA, 5baA) in which the content of the high thermal conductive filler in the dielectric films 1aA, 1bA is relatively high (i.e., the high thermal conductive portion 8aA with the high thermal conductivity); and the low thermal conductive portions 8bA (the metalized films 5abA, 5bbA) in each of which the content of the high thermal conductive filler in the dielectric films 1aA, 1bA is relatively low, or the high thermal conductive filler is not contained (i.e., the low thermal conductive portions 8bA with the low thermal conductivity). The high thermal conductive portion 8aA is provided to continuously extend from the inside of the stacked body 5A (particularly, a center portion whose temperature may become a high temperature) to side portions (front and rear side portions in the illustrated example) other than both of side portions (electrode forming ends) 6aA, 6bA respectively provided with external electrodes 9aA, 9bA. In this way, heat generated in the stacked body 5A is transferred to the side portions other than both of the side portions 6aA, 6bA respectively provided with the external electrodes 9aA, 9bA, via the high thermal conductive portion 8aA, and is dissipated to the outside. Meanwhile, portions (upper portions and lower portions in the illustrated example) of both of the side portions 6aA, 6bA respectively provided with the external electrodes 9aA, 9bA and portions inside the upper portions and the lower portions of the side portions 6aA, 6bA are constituted by the low thermal conductive portions 8bA in which the content of the high thermal conductive filler is relatively low or the high thermal conductive filler is not contained. Thus, the workability in producing the film capacitor 10A can reliably be secured while the heat resistance and the heat dissipation thereof are maintained. In addition, the production cost thereof can be effectively reduced.

In addition, the dielectric films 1aA, 1bA of the stacked body 5A respectively include: the high thermal conductive films 1aaA, 1baA in which the content of the high thermal conductive filler is relatively high and the high thermal conductive filler is disposed in the dispersed manner; and the low thermal conductive films 1abA, 1bbA in which the content of the high thermal conductive filler is relatively low and the high thermal conductive filler is disposed in the dispersed manner, or the high thermal conductive filler is not contained. Thus, the film capacitor 10A of the second embodiment also has such an advantage that a configuration of the inside of the stacked body 5A can be simplified.

Third Embodiment

Figure 5:
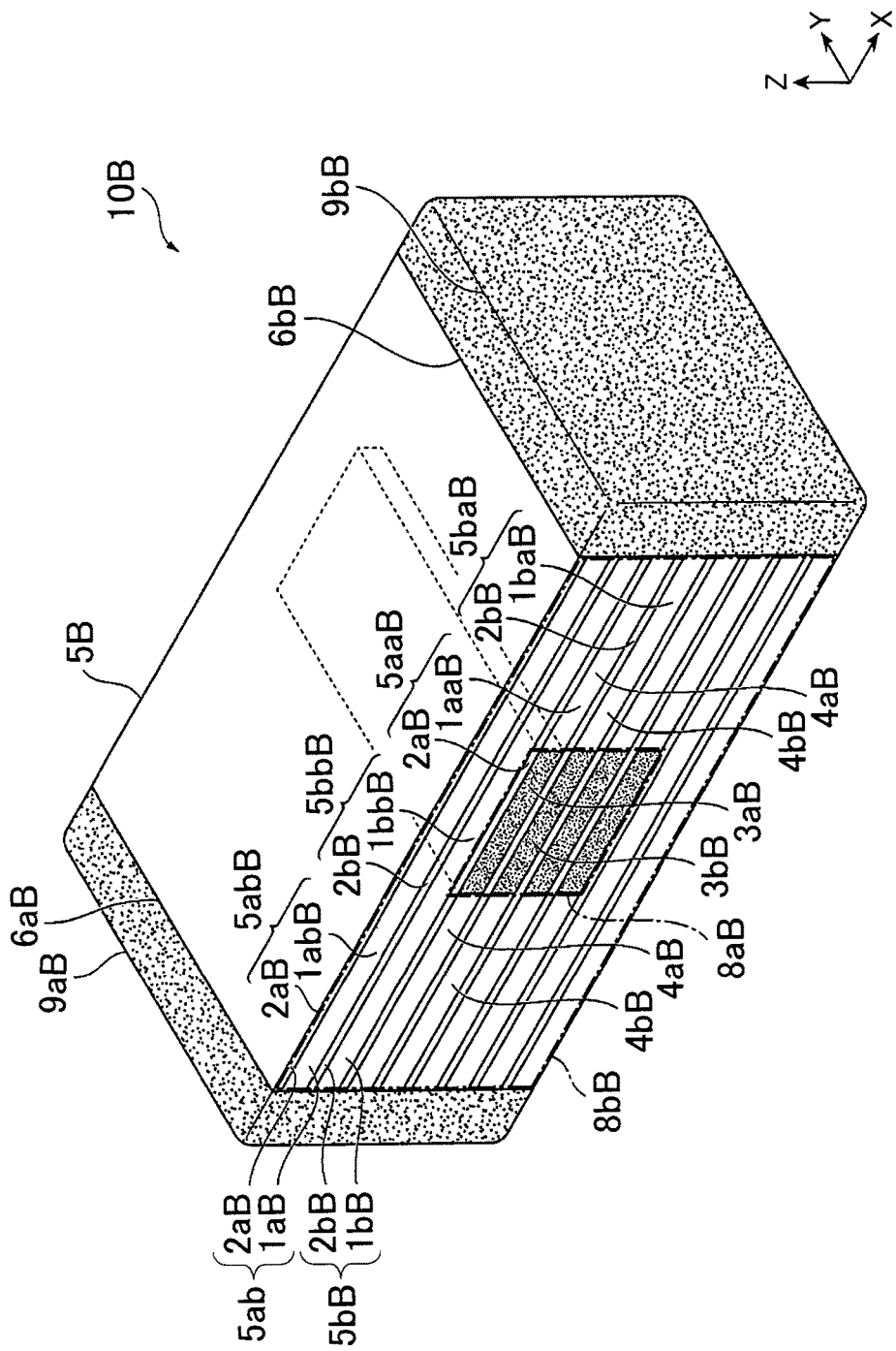
FIG. 5 is a perspective view showing a basic configuration of a film capacitor according to a third embodiment of the invention.

FIG. 5 is a perspective view showing a basic configuration of a film capacitor according to a third embodiment of the invention. A film capacitor 10B of the third embodiment, which is shown in FIG. 5, differs from the film capacitors 10, 10A of the first and second embodiments described above in terms of the internal structure of the stacked body. The rest of a configuration of the film capacitor 10B is substantially the same as that of the film capacitors 10, 10A of the first and second embodiments. Thus, the same configuration as those of the film capacitors 10, 10A of the first and second embodiments will not be described in detail.

In the third embodiment, dielectric films 1aB, 1bB of a stacked body 5B of the film capacitor 10B respectively include high thermal conductive films 1aaB, 1baB and low thermal conductive films 1abB, 1bbB. The high thermal conductive films 1aaB, 1baB respectively include: high thermal conductive regions 3aB, 3bB in which the content of the high thermal conductive filler is relatively high; and low thermal conductive regions 4aB, 4bB in which the content of the high thermal conductive filler is relatively low, or the high thermal conductive filler is not contained. In the low thermal conductive films 1abB, 1bbB, the content of the high thermal conductive filler is relatively low and the high thermal conductive filler is disposed in the dispersed manner, or the high thermal conductive filler is not contained.

As in the high thermal conductive regions 3a, 3b and the low thermal conductive regions 4a, 4b of the film capacitor 10 of the first embodiment, the high thermal conductive regions 3aB, 3bB of the high thermal conductive films 1aaB, 1baB are respectively provided to extend in the front-rear direction in central portions that are formed by substantially equally dividing the dielectric films 1aB, 1bB (the high thermal conductive films 1aaB, 1baB) into three in the right-left direction. The low thermal conductive regions 4aB, 4bB are respectively provided in side portions (right side portions and left side portions that are formed by substantially equally dividing the dielectric films 1aB, 1bB (the high thermal conductive films 1aaB, 1baB) into three in the right-left direction) on the sides of the high thermal conductive regions 3aB, 3bB provided in the central portions.

In metalized films 5aaB, 5baB, metal electrodes 2aB, 2bB are respectively formed on surfaces of the high thermal conductive films 1aaB, 1baB that respectively include the high thermal conductive regions 3aB, 3bB and the low thermal conductive regions 4aB, 4bB. The metalized films 5aaB, 5baB are stacked in a central portion in the stacking direction (the thickness direction). In metalized films 5abB, 5bbB, the metal electrodes 2aB, 2bB are formed on surfaces of the low thermal conductive films 1abB, 1bbB. The metalized films 5abB, 5bbB are stacked on an upper side and a lower side of the metalized films 5aaB, 5baB in the stacking direction (the thickness direction). In this way, a high thermal conductive portion 8aB is constituted by the high thermal conductive regions 3aB, 3bB of the high thermal conductive films 1aaB, 1baB and the metal electrodes formed on the upper surfaces thereof. The high thermal conductive portion 8aB is provided in a portion that is located in the central portion formed by substantially equally dividing the stacked body 5B into three in the right-left direction, and that is also located in a central portion in the stacking direction (such that the high thermal conductive portion 8aB extends in the front-rear direction). The low thermal conductive portions 8bB are constituted by: the low thermal conductive regions 4aB, 4bB of the high thermal conductive films 1aaB, 1baB; the metal electrodes formed on the upper surfaces thereof; and the metalized films 5abB, 5bbB in which the metal electrodes are formed on the upper surfaces of the low thermal conductive films 1abB, 1bbB. The low thermal conductive portions 8bB are provided outside (on a left side, a right side, an upper side, and a lower side of) the high thermal conductive portion 8aB.

In the film capacitor 10B of the third embodiment as well, the same effects as those of the film capacitors 10, 10A of the first and second embodiments described above can be obtained.

Fourth Embodiment

Figure 6:
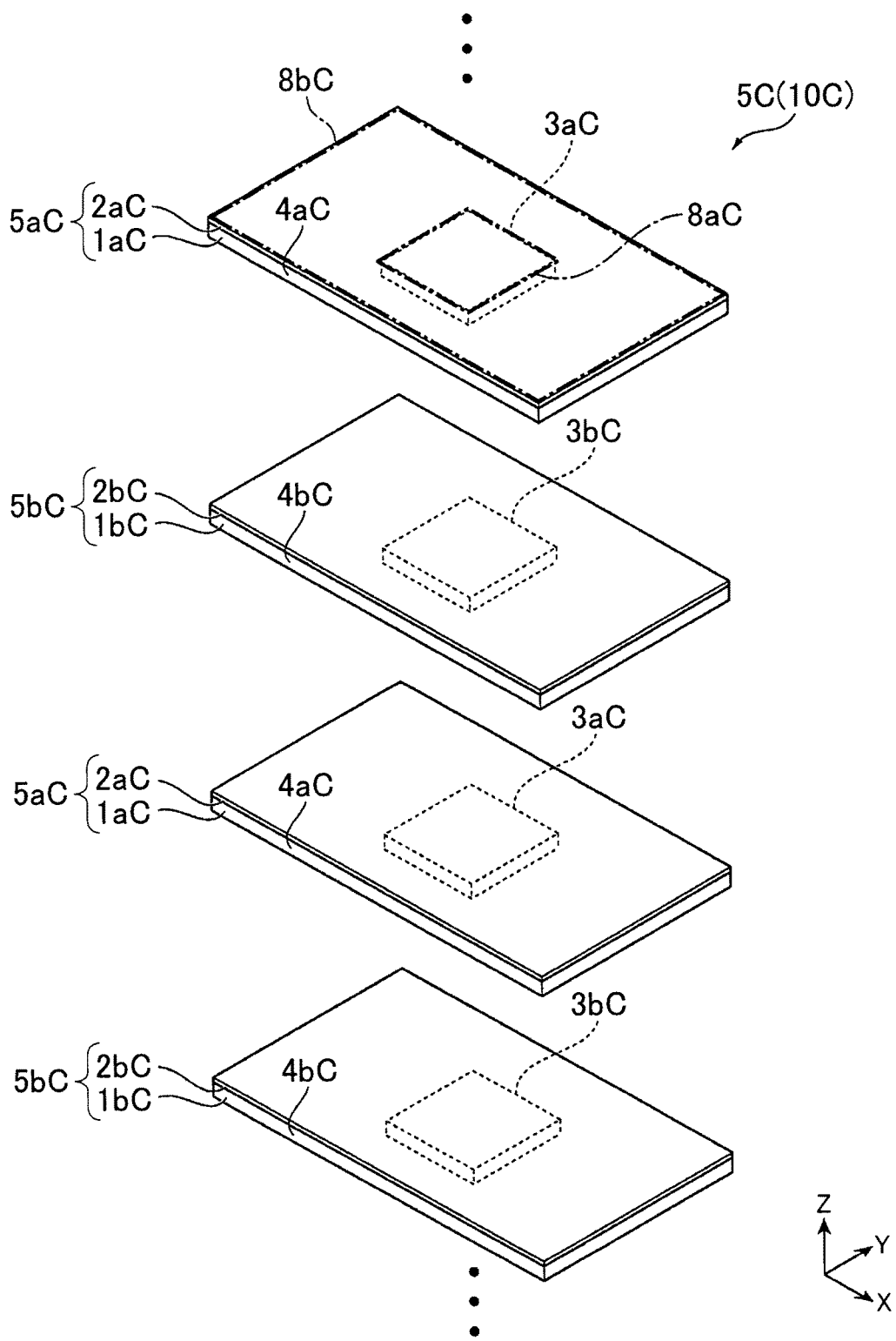
FIG. 6 is an exploded perspective view in which a stacked body of a film capacitor according to a fourth embodiment of the invention is exploded.

FIG. 6 is an exploded perspective view in which a stacked body of a film capacitor according to a fourth embodiment of the invention is exploded. A film capacitor 10C of the fourth embodiment, which is shown in FIG. 6, differs from the film capacitors 10, 10A, 10B of the first to third embodiments described above in terms of the internal structure of the stacked body. The rest of a configuration of the film capacitor 10C is substantially the same as that of the film capacitors 10, 10A, 10B of the first to third embodiments. Thus, the same configuration as those of the film capacitors 10, 10A, 10B of the first to third embodiments will not be described in detail.

In this fourth embodiment, dielectric films 1aC, 1bC of a stacked body 5C of the film capacitor 10C respectively include: high thermal conductive regions 3aC, 3bC in which the content of the high thermal conductive filler is relatively high; and low thermal conductive regions 4aC, 4bC in which the content of the high thermal conductive filler is relatively low, or the high thermal conductive filler is not contained.

In an illustrated example, when seen in the thickness direction of the dielectric films 1aC, 1bC, the high thermal conductive regions 3aC, 3bC are respectively provided (in substantially rectangular shapes in a plan view) in central portions of the dielectric films 1aC, 1bC, and the low thermal conductive regions 4aC, 4bC are respectively provided around the high thermal conductive regions 3aC, 3bC provided in the central portions.

In metalized films 5aC, 5bC, metal electrodes 2aC, 2bC are respectively formed on surfaces of the dielectric films 1aC, 1bC that respectively include the high thermal conductive regions 3aC, 3bC and the low thermal conductive regions 4aC, 4bC, as described above. The metalized films 5aC, 5bC are stacked such that the high thermal conductive regions 3aC, 3bC are superimposed on each other (placed on top of each other). Thus, a high thermal conductive portion 8aC is constituted by the high thermal conductive regions 3aC, 3bC of the dielectric films 1aC, 1bC and the metal electrodes formed on upper surfaces thereof. The high thermal conductive portion 8aC is provided (to extend in the up-down direction) in a central portion (in the plan view) of the stacked body 5C. A low thermal conductive portion 8bC is constituted by the low thermal conductive regions 4aC, 4bC and the metal electrodes formed on upper surfaces thereof, and the low thermal conductive portion 8bC is provided around the high thermal conductive portion 8aC.

In the film capacitor 10C of the fourth embodiment as well, the same effects as those of the film capacitors 10, 10A, 10B of the first to third embodiments described above can be obtained.

Figure 7:
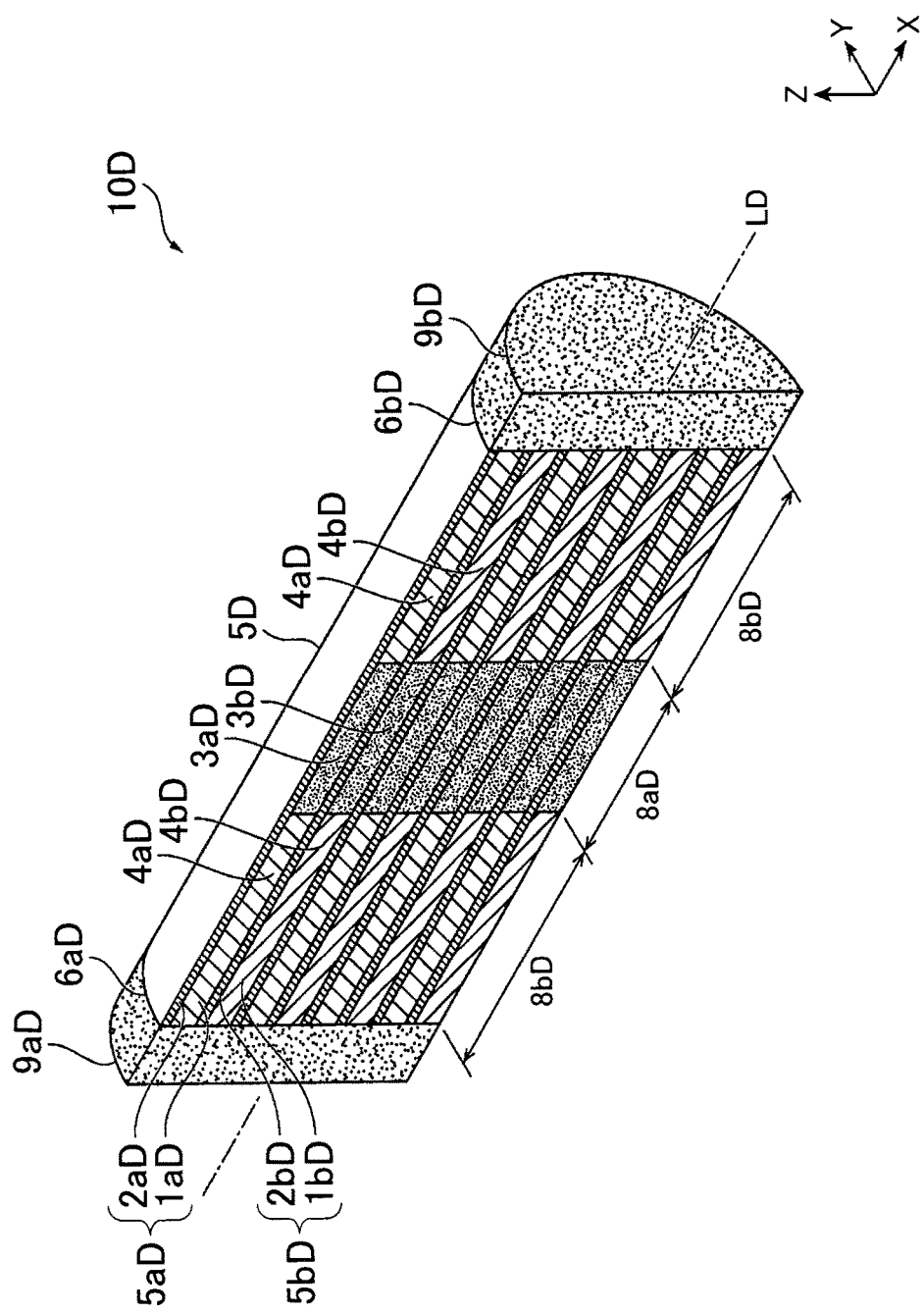
FIG. 7 is a sectional perspective view showing a basic configuration of a film capacitor according to a fifth embodiment of the invention.
Figure 8:
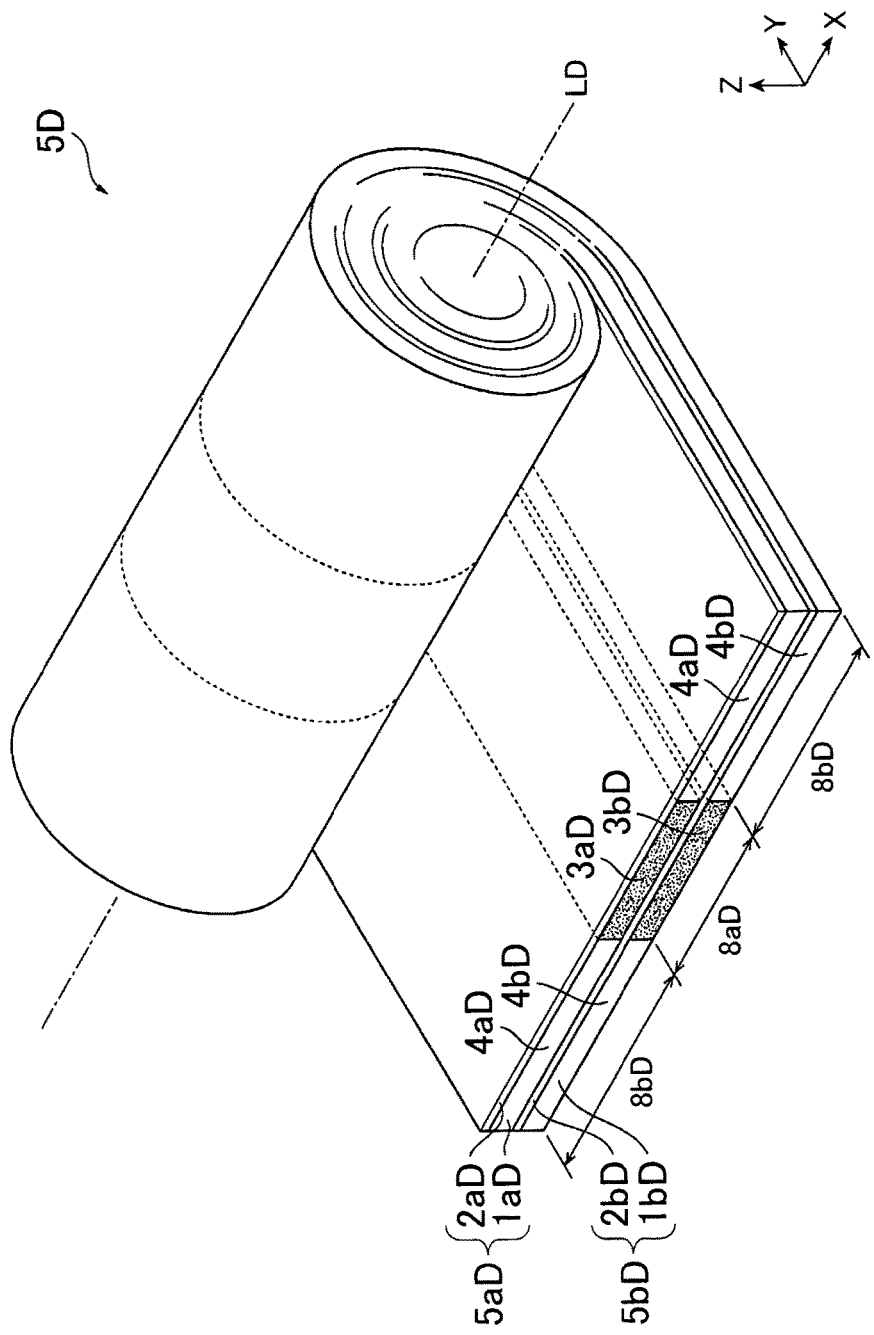
FIG. 8 is an exploded perspective view in which a portion of a stacked body of the film capacitor shown in FIG. 7 is exploded.

(Fifth embodiment) FIG. 7 is a sectional perspective view showing a basic configuration of a film capacitor according to a fifth embodiment of the invention, and FIG. 8 is an exploded perspective view in which a portion of a stacked body of the film capacitor shown in FIG. 7 is exploded (developed). A film capacitor 10D of the fifth embodiment, which is shown in FIG. 7 and FIG. 8, differs from the film capacitor 10 of the first embodiment described above in terms of the internal structure of the stacked body. The rest of a configuration of the film capacitor 10D is substantially the same as that of the film capacitor 10 of the first embodiment. Thus, the same configuration as that of the film capacitor 10 of the first embodiment will not be described in detail.

The film capacitor 10D, which is shown, mainly includes: a stacked body 5D that is formed by winding a pair of elongated metalized films 5aD, 5bD (the metalized films 5aD, 5bD in which metal electrodes 2aD, 2bD are respectively formed on surfaces of elongated dielectric films 1aD, 1bD) around a winding core LD; and external electrodes 9aD, 9bD that are respectively formed in both of opposed ends (electrode forming ends) 6aD, 6bD (in a winding core LD direction) of the stacked body 5D. It should be noted that the winding core LD may be constituted by a core member in a columnar shape or a cylindrical shape, for example. Alternatively, the winding core LD may be a hollow core in which the core member is not used. In addition, each of the metalized films 5aD, 5bD may be wound to have a substantially circular cross section or may be wound to have a substantially rectangular cross section, for example.

The dielectric films 1aD, 1bD of the stacked body 5D respectively include: high thermal conductive regions 3aD, 3bD in which the content of the high thermal conductive filler is relatively high (that is, the high thermal conductive regions 3aD, 3bD with the high thermal conductivity); and low thermal conductivity regions 4aD, 4bD in which the content of the high thermal conductive filler is relatively low, or the high thermal conductive filler is not contained (that is, the low thermal conductivity regions 4aD, 4bD with the low thermal conductivity).

In the illustrated example, the high thermal conductive regions 3aD, 3bD are provided to continuously extend (in a longitudinal direction) in central portions that are formed by substantially equally dividing the dielectric films 1aD, 1bD into three in the right-left direction. The low thermal conductivity regions 4aD, 4bD are respectively provided in side portions (right side portions and left side portions that are formed by substantially equally dividing the dielectric films 1aD, 1bD into three in the right-left direction) on the sides of the high thermal conductive regions 3aD, 3bD provided in the central portions such that the low thermal conductivity regions 4aD, 4bD continuously extend.

In the metalized films 5aD, 5bD, the metal electrodes 2aD, 2bD are respectively formed on the surfaces of the dielectric films 1aD, 1bD that respectively include the high thermal conductive regions 3aD, 3bD and the low thermal conductivity regions 4aD, 4bD, as described above. The metalized films 5aD, 5bD are wound such that the high thermal conductive regions 3aD, 3bD are superimposed on each other (see FIG. 8). Thus, a high thermal conductivity portion 8aD is constituted by the high thermal conductive regions 3aD, 3bD of the dielectric films 1aD, 1bD and the metal electrodes formed on the upper surfaces thereof. The high thermal conductivity portion 8aD is provided (to extend in a radial direction) in a central portion that is formed by substantially equally dividing the stacked body 5D into three in the right-left direction. Low thermal conductive portions 8bD are constituted by the low thermal conductivity regions 4aD, 4bD and the metal electrodes formed on the upper surfaces thereof. The low thermal conductive portions 8bD are provided on side portions (a right side portion and a left side portion that are formed by substantially equally dividing the stacked body 5D into three in the right-left direction) on the sides of the high thermal conductive portion 8aD.

In the film capacitor 10D of the fifth embodiment as well, as in the film capacitor 10 of the first embodiment described above, the stacked body 5D that is formed by stacking the metalized films 5aD, 5bD in the thickness direction includes: the high thermal conductive portion 8aD in which the content of the high thermal conductive filler in the dielectric films 1aD, 1bD is relatively high (i.e., the high thermal conductive portion 8aD with the high thermal conductivity); and the low thermal conductive portions 8bD in which the content of the high thermal conductive filler in the dielectric films 1aD, 1bD is relatively low, or the high thermal conductive filler is not contained (i.e., the low thermal conductive portions 8bD with the low thermal conductivity). The high thermal conductive portion 8aD is provided to continuously extend from the inside of the stacked body 5D (particularly, a center portion whose temperature may become a high temperature) to circumferential side portions other than both of the ends 6aD, 6bD respectively provided with the external electrodes 9aD, 9bD. Thus, heat generated in the stacked body 5D is transferred to the circumferential side portions other than both of the ends (the electrode forming ends) 6aD, 6bD respectively provided with the external electrodes 9aD, 9bD, via the high thermal conductive portion 8aD, and the heat is dissipated to the outside. Meanwhile, both of the ends 6aD, 6bD respectively provided with the external electrodes 9aD, 9bD and portions inside the ends 6aD, 6bD are constituted by the low thermal conductive portions 8bD in which the content of the high thermal conductive filler is relatively low or the high thermal conductive filler is not contained. Thus, the workability in producing the film capacitor 10D can reliably be secured while the heat resistance and the heat dissipation thereof are maintained. In addition, the production cost thereof can be effectively suppressed.

It should be noted that, in the first to fifth embodiments described above, the high thermal conductive portion that is constituted by the high thermal conductive regions and the high thermal conductive films is provided at a position that extends through the center portion of (the stacked body of) the film capacitor, so as to effectively dissipate heat in the center portion whose temperature may become the highest temperature in the film capacitor. However, the high thermal conductive portion does not necessarily need to extend through the center portion of (the stacked body of) the film capacitor as long as the high thermal conductive portion is provided to continuously extend from the inside of (the stacked body of) the film capacitor to the side portion thereof. The position and size (a range) of the high thermal conductive portion with respect to the entire film capacitor may be appropriately changed in accordance with, for example, an arrangement environment in which the film capacitor is arranged. Alternatively, the high thermal conductive portion may be divided and disposed at plural positions of the stacked body of the film capacitor.

(An experiment on measurement of temperature distributions of the film capacitors by using test samples and a result thereof) The inventor produced plural test samples (Examples 1, 2, and Comparative examples 1, 2) in which stacked bodies had different internal structures, and measured a temperature distribution of the inside of the stacked body of each of the test samples.

(A method for producing the test samples of the film capacitors) First, a method for producing the test samples of the film capacitors according to Examples 1, 2 and Comparative Examples 1, 2 will be briefly described. The inventor used the film capacitor of the first embodiment described above as the film capacitor according to Example 1, and set a ratio of a dimension of the high thermal conductive region in the right-left direction (a direction toward both of the side portions provided with the external electrodes) to a dimension of the dielectric films in the right-left direction at approximately 30%. In addition, the film capacitor of the second embodiment described above was used as the film capacitor according to Example 2, and a ratio of a dimension of the high thermal conductive films in the up-down direction (the stacking direction) to a dimension of the stacked body in the up-down direction was set at approximately 30%. Furthermore, the film capacitor according to Comparative Example 1 was constituted by: a stacked body that was formed by superimposing on each other metalized films in which metal electrodes were formed on surfaces of dielectric films containing no high thermal conductive filler; and external electrodes respectively formed on both of opposed side portions of the stacked body. Moreover, the film capacitor according to Comparative Example 2 was constituted by: a stacked body that was formed by superimposing on each other metalized films in which metal electrodes were formed on surfaces of dielectric films in which the content of the high thermal conductive filler was relatively high (the content was equivalent to the content in the high thermal conductive regions in Example 1 and the content in the high thermal conductive films in Example 2) and the high thermal conductive filler was disposed in the dispersed manner; and external electrodes respectively formed on both of opposed side portions of the stacked body.

Here, the thermal conductivity of the high thermal conductive region in the test sample of Example 1, the thermal conductivity of the high thermal conductive film in the test sample of Example 2, and the thermal conductivity of the dielectric film of the test sample of Comparative Example 2 were approximately 1.0 W/m·K, and the thermal conductivities of the other portions were approximately 0.1 to 0.3 W/m·K.

Figure 9:
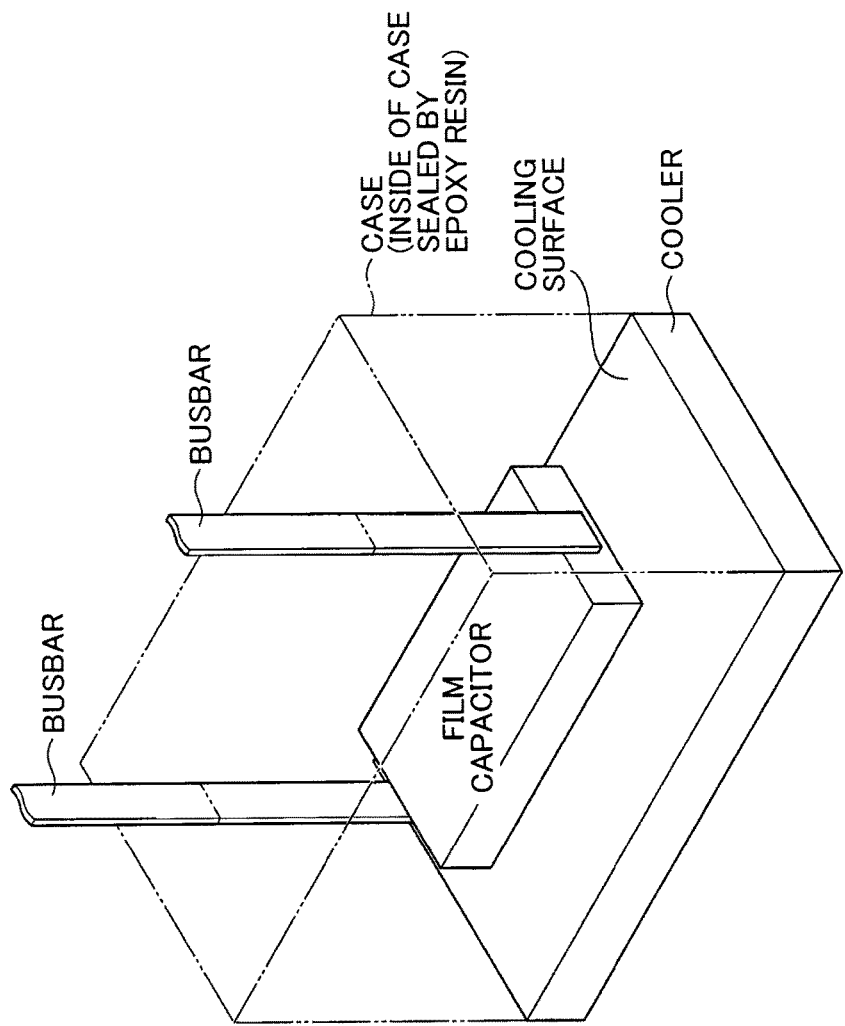
FIG. 9 is a schematic view that schematically explains a method for measuring a temperature of a film capacitor by using a test sample.

(A method for measuring the temperature distribution of the film capacitor by using each test sample) Next, a method for measuring the temperature distribution of the film capacitor by using each test sample will be briefly described. As shown in FIG. 9, the inventor attached a busbar to each of the external electrodes in each of the test samples, accommodated the test sample in the above-mentioned state in a case, covered the test sample by using a molding material made of the epoxy resin, and placed the case on a cooler such that a lower surface of the case was in contact with a cooling surface of the cooler. Then, the inventor measured temperatures at nine positions in a region from the center portion to the side portion (the end) at the external electrode side at a time when the test sample (the film capacitor) was energized via the busbars.

Here, element capacitance of each of the test samples was 150 μF, a bias was 300 Vdc, ripple was 16 Arms at 10 kHz, an ambient temperature at a time of the temperature measurement was 90° C., and a temperature of the cooling surface of the cooler was 50° C.

Figure 10:
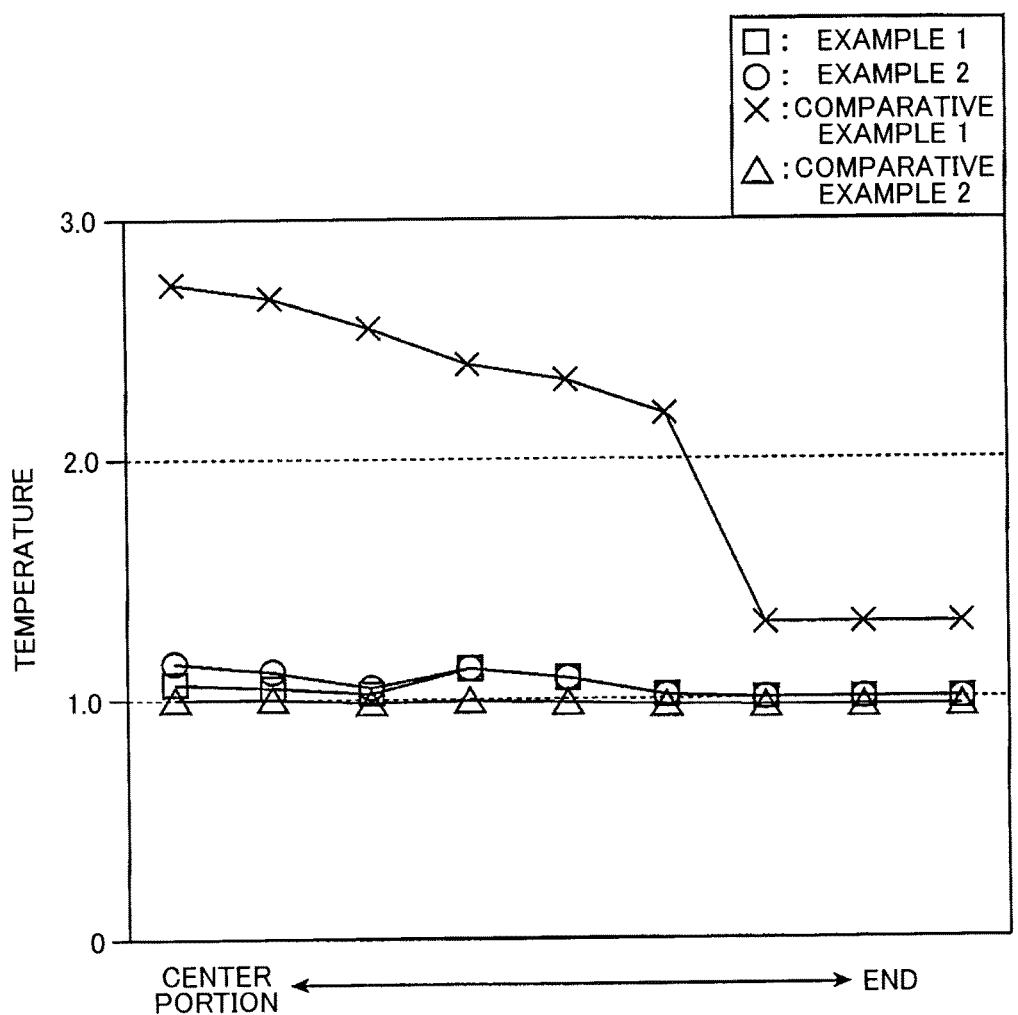
FIG. 10 is a graph showing a result of measurement of a temperature distribution of the film capacitor by using each test sample.

(A result of the measurement of the temperature distributions of the film capacitors by using the test samples) FIG. 10 shows the result of the measurement of the temperature distributions of the film capacitors by using the test samples. It should be noted that, in FIG. 10, a temperature at the center portion of Comparative Example 2 is indicated as 1.

As shown in the graph, it was confirmed that in Comparative Example 1, the temperature was high in the region from the center portion of the film capacitor to the end at the external electrode side, in particular, the temperature increased toward the center portion of the film capacitor. Meanwhile, it was confirmed that in each of Examples 1, 2, the film capacitor had the temperature distribution equivalent to that of Comparative Example 2 in the region from the center portion of the film capacitor to the end at the external electrode side. In particular, it was confirmed that the temperature distribution in a region in the vicinity of the center portion of the film capacitor in Example 1 was closer to the temperature distribution in Comparative Example 2 than the temperature distribution in Example 2 was.

In each of Examples 1 and 2, the stacked body that was formed by stacking the metalized films included: the high thermal conductive portion in which the content of the high thermal conductive filler in the dielectric films was relatively high; and the low thermal conductive portions in which the content of the high thermal conductive filler in the dielectric films was relatively low, or the high thermal conductive filler was not contained. The high thermal conductive portion was provided to continuously extend from the inside (particularly, the center portion whose temperature may become a high temperature) of the stacked body to the side portions other than both of the side portions (the electrode forming ends) provided with the external electrodes. Thus, it was verified from this experiment result that in each of Examples 1 and 2 with the above-mentioned configuration, it was possible to obtain the heat resistance and the heat dissipation equivalent to those of the film capacitor in Comparative Example 2 which included the stacked body formed by superimposing on each other the metalized films in which the metal electrodes were formed on the surfaces of the dielectric films in which the content of the high thermal conductive filler was relatively high and the high thermal conductive filler was disposed in the dispersed manner, and it was possible to effectively reduce the temperature in the inside (particularly, the center portion) of the stacked body.

(An experiment on measurement of a relationship between the cooling temperature and the center portion temperature of the film capacitor by using each test sample and a result thereof) The inventor used the above-mentioned plural test samples (Examples 1, 2, and Comparative Examples 1, 2) and measured the temperature of the center portion of the stacked body at a time when the cooling temperature was changed for each of the test samples. It should be noted that the experiment apparatus shown in FIG. 9 was used in this experiment and the temperature at the center portion was measured at a time when the temperature of the cooling surface of the cooler (that is, the temperature of the lower surface of the case) was changed from 40° C. to 55° C. It should also be noted that the other experimental conditions were the same as the experimental conditions for the above-mentioned method for measuring the temperature distribution of the film capacitor by using each test sample.

Figure 11:
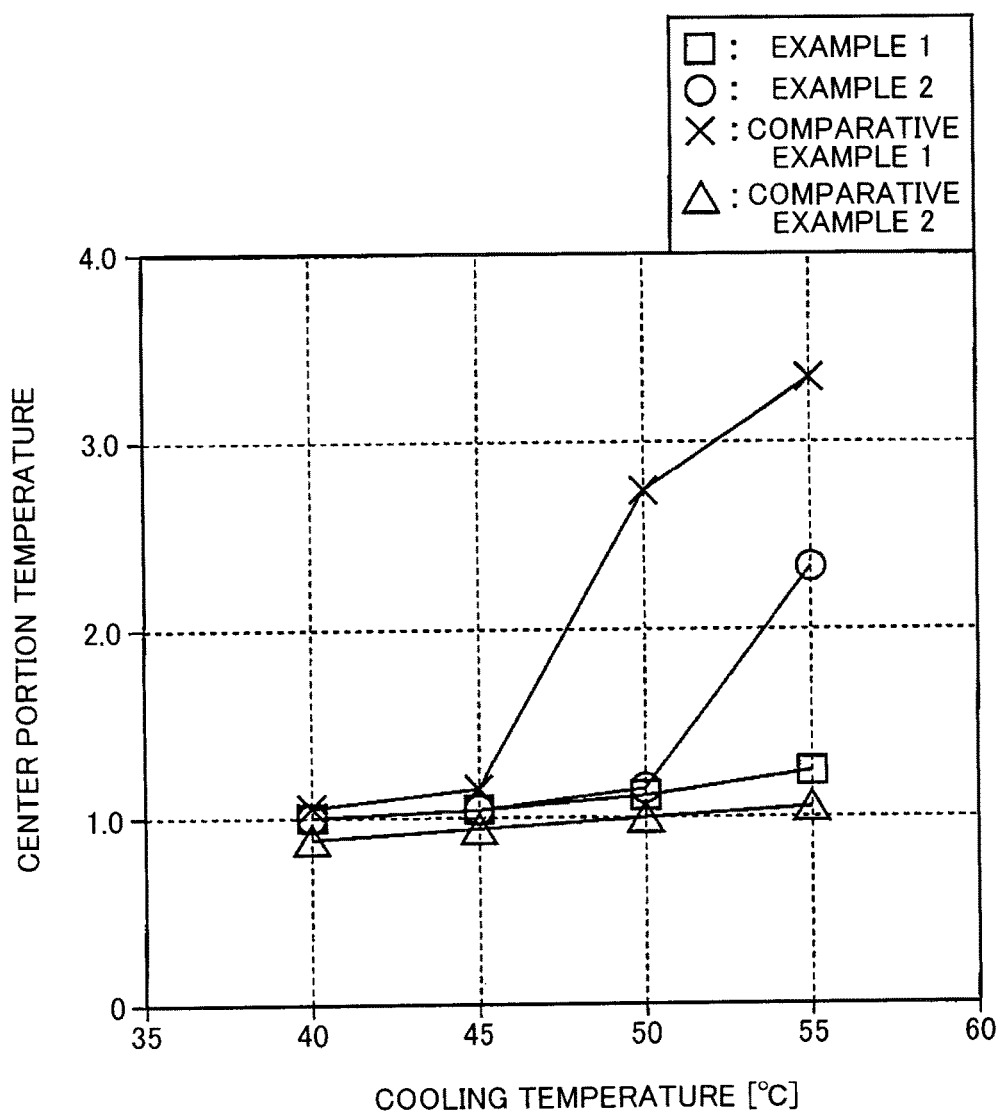
FIG. 11 is a graph showing a result of measurement of a relationship between a cooling temperature and a center portion temperature of the film capacitor by using each test sample.

(A result of measurement of the relationship between the cooling temperature and the center portion temperature of the film capacitor by using each test sample) FIG. 11 shows the result of measurement of the relationship between the cooling temperature and the center portion temperature of the film capacitor by using each test sample. It should be noted that, in FIG. 11, the temperature at the center portion of Comparative Example 2 at a time when the temperature of the cooling surface of the cooler was 50° C. is indicated as 1.

As shown in the graph, it was confirmed that in Comparative Example 1, the temperature at the center portion of the film capacitor (the center portion temperature) increased when the cooling temperature exceeded 45° C. Meanwhile, it was confirmed that in each of Examples 1 and 2, as in Comparative Example 2, the center portion temperature did not increase abruptly (sharply) when the cooling temperature was between 45° C. and 50° C. In addition, it was confirmed that the center portion temperature gradually increased in Example 2 when the cooling temperature exceeded 50° C.; however, as in Comparative Example 2, the center portion temperature did not increase abruptly in Example 1. That is, it was confirmed that the cooling temperature needed to be set at 45° C. or lower for the test sample of Comparative Example 1; however, the cooling temperature only needed to be set at 50° C. or lower for the test sample of Example 2. In addition, it was confirmed that the cooling temperature could be set at 55° C. or higher for the test sample of Example 1.

It should be noted that the inventor confirmed that the same result as the result shown in FIG. 11 was obtained even in the case where the film capacitor was cooled in a state where the cooler was disposed with respect to the case such that the cooling surface of the cooler was in contact with an external electrode-side surface of the case (i.e., the side surface of the case at the external electrode side).

In each of Examples 1 and 2, the stacked body that was formed by stacking the metalized films included: the high thermal conductive portion in which the content of the high thermal conductive filler in the dielectric films was relatively high; and the low thermal conductive portions in which the content of the high thermal conductive filler in the dielectric films was relatively low, or the high thermal conductive filler was not contained. The high thermal conductive portion was provided to continuously extend from the inside (particularly, the center portion whose temperature may become a high temperature) of the stacked body to the side portions other than both of the side portions (the electrode forming ends) provided with the external electrodes. Thus, it was verified from this experiment result that in each of Examples 1 and 2 with the above-mentioned configuration, it was possible to obtain the heat resistance and the heat dissipation equivalent to those of the film capacitor in Comparative Example 2 which included the stacked body formed by superimposing on each other the metalized films in which the metal electrodes were formed on the surfaces of the dielectric films in which the content of the high thermal conductive filler was relatively high and the high thermal conductive filler was disposed in the dispersed manner, and thus, it was possible to significantly expand the use range or the application range of the film capacitor.

The embodiments of the invention have been described in detail so far by using the drawings. The specific configurations are not limited to those of the embodiments, and design changes and the like within the scope of the invention are included in the invention.

What is claimed is:

1. A film capacitor comprising:
   a stacked body formed by stacking metalized films in each of which a metal electrode is formed on a surface of a dielectric film, at least one of the dielectric films of the stacked body containing a high thermal conductive filler; and
   external electrodes formed at electrode forming ends provided at opposed positions in the stacked body, wherein:
   the stacked body includes a high thermal conductive portion in which a content of the high thermal conductive filler in the at least one dielectric film is relatively high, and a low thermal conductive portion in which the content of the high thermal conductive filler in the at least one dielectric film is relatively low, or the high thermal conductive filler is not contained; and
   the high thermal conductive portion is provided to continuously extend from an inside of the stacked body to a side portion other than the electrode forming ends, wherein:
   the dielectric films of the stacked body include a high thermal conductive film in which the content of the high thermal conductive filler is relatively high and the high thermal conductive filler is disposed in a dispersed manner, and a low thermal conductive film in which the content of the high thermal conductive filler is relatively low and the high thermal conductive filler is disposed in the dispersed manner, or the high thermal conductive filler is not contained; and
   the metalized film, in which the metal electrode is formed on a surface of the high thermal conductive film, is stacked at a relatively inner position in a stacking direction, and the metalized film, in which the metal electrode is formed on a surface of the low thermal conductive film, is stacked at a relatively outer position in the stacking direction, so as to form the stacked body.

2. The film capacitor according to claim 1, wherein the stacked body is formed by superimposing on each other plural pairs of the metalized films in a thickness direction.

3. A film capacitor comprising:
   a stacked body formed by stacking metalized films in each of which a metal electrode is formed on a surface of a dielectric film, at least one of the dielectric films of the stacked body containing a high thermal conductive filler; and
   external electrodes formed at electrode forming ends provided at opposed positions in the stacked body, wherein:
   the stacked body includes a high thermal conductive portion in which a content of the high thermal conductive filler in the at least one dielectric film is relatively high, and a low thermal conductive portion in which the content of the high thermal conductive filler in the at least one dielectric film is relatively low, or the high thermal conductive filler is not contained; and
   the high thermal conductive portion is provided to continuously extend from an inside of the stacked body to a side portion other than the electrode forming ends, wherein:
   the dielectric films of the stacked body include a high thermal conductive film and a low thermal conductive film;
   the high thermal conductive film includes a high thermal conductive region in which the content of the high thermal conductive filler is relatively high, and a low thermal conductive region in which the content of the high thermal conductive filler is relatively low, or the high thermal conductive filler is not contained;
   in the high thermal conductive film, the high thermal conductive region is provided to continuously extend from an inside of the high thermal conductive film to an end of the high thermal conductive film, the end corresponding to the side portion other than the electrode forming ends, when seen in a thickness direction of the high thermal conductive film;

in the low thermal conductive film, the content of the high thermal conductive filler is relatively low and the high thermal conductive filler is disposed in a dispersed manner, or the high thermal conductive filler is not contained; and the metalized film, in which the metal electrode is formed on a surface of the high thermal conductive film, is stacked at a relatively inner position in a stacking direction, and the metalized film, in which the metal electrode is formed on a surface of the low thermal conductive film, is stacked at a relatively outer position in the stacking direction, so as to form the stacked body.

4. The film capacitor according to claim 3, wherein the stacked body is formed by superimposing on each other plural pairs of the metalized films in a thickness direction.

* * * * *